(12) United States Patent
Shishido et al.

(10) Patent No.: US 6,704,262 B2
(45) Date of Patent: Mar. 9, 2004

(54) OPTICAL DISC AND OPTICAL DISC APPARATUS FOR IDENTIFYING SYNCHRONIZATION PATTERNS THEREOF

(75) Inventors: Yukio Shishido, Kanagawa (JP); Tetsuji Kawashima, Kanagawa (JP)

(73) Assignee: Sony Corporation, Tokyo (JP)

( * ) Notice: Subject to any disclaimer, the term of this patent is extended or adjusted under 35 U.S.C. 154(b) by 488 days.

(21) Appl. No.: 09/733,367

(22) Filed: Dec. 8, 2000

(65) Prior Publication Data
US 2002/0027855 A1 Mar. 7, 2002

(30) Foreign Application Priority Data
Dec. 10, 1999 (JP) ............................................ 11-352091

(51) Int. Cl.[7] ................................................ G11B 3/90
(52) U.S. Cl. .................................. 369/53.22; 369/59.25
(58) Field of Search .......................... 369/44.13, 47.19, 369/47.48, 47.55, 53.2, 53.22, 53.37, 53.41, 53.45, 59.23, 59.25, 59.26

(56) References Cited

U.S. PATENT DOCUMENTS

| 5,737,287 A | | 4/1998 | Lee | |
|---|---|---|---|---|
| 5,745,461 A | * | 4/1998 | Kawasaki | 369/53.23 |
| 5,764,610 A | | 6/1998 | Yoshida et al. | |
| 6,097,695 A | * | 8/2000 | Kobayashi | 369/275.4 |
| 6,249,499 B1 | * | 6/2001 | Andoh | 369/53.22 |

FOREIGN PATENT DOCUMENTS

| EP | 0 674 314 | 9/1995 |
|---|---|---|
| EP | 0 800 165 | 10/1997 |
| EP | 0 813 189 | 12/1997 |
| JP | 11-238297 | 8/1999 |

OTHER PUBLICATIONS

Patent Abstracts of Japan 08 315367 A (Ricoh Co Ltd) Nov. 29, 1996.
Patent Abstracts of Japan 10 208248 A (Sony Corp) Aug. 7, 1998.
Patent Abstracts of Europe EP1115109.

* cited by examiner

Primary Examiner—Paul W. Huber
(74) Attorney, Agent, or Firm—Frommer Lawrence & Haug LLP; William S. Frommer

(57) ABSTRACT

The objective of the present invention is to facilitate to identify whether or not the optical disc is a optical disc of which recording capacity is enlarged. A synchronization pattern of ATIP information embedded into guide grooves irradiated with a light spot is made to be different between a high density optical disc and a standard density optical disc of which recording capacity is not enlarged. Specifically, while the synchronization pattern of the standard density optical disc is made into "3T+1T+1T+3T" (where "T" represents a minimum channel bit of a signal obtained by reading a positional information), the synchronization pattern of the high density optical disc is made into "3T+3T+1T+1T" for example. By reading the ATIP information and recognizing the synchronization pattern thereof, it can be easily and quickly identified whether the optical disc has a standard density or a high density.

17 Claims, 10 Drawing Sheets

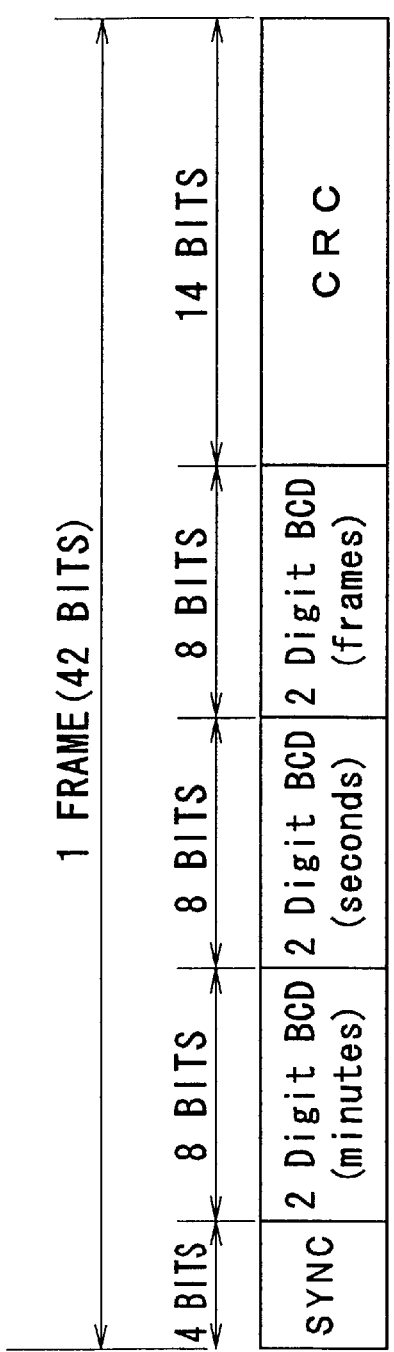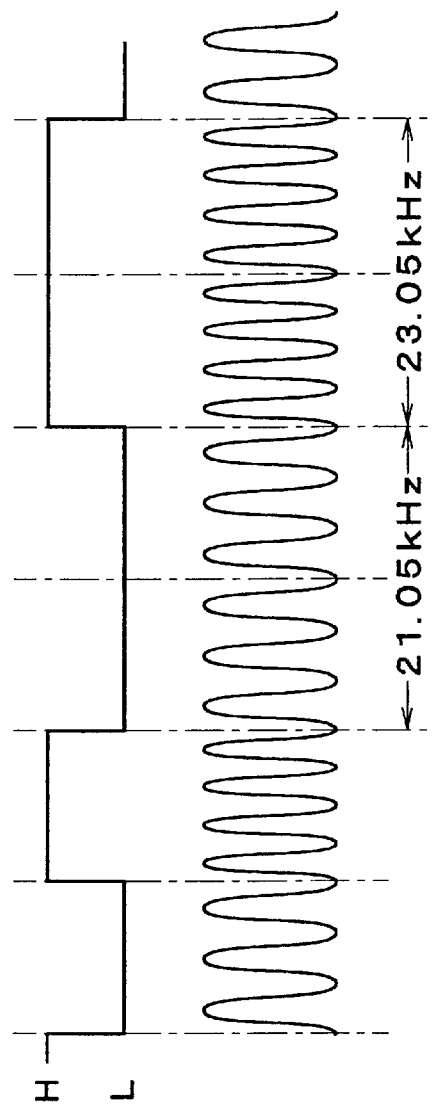

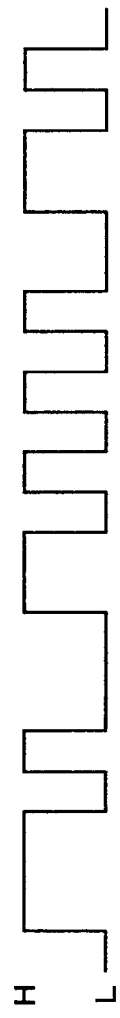
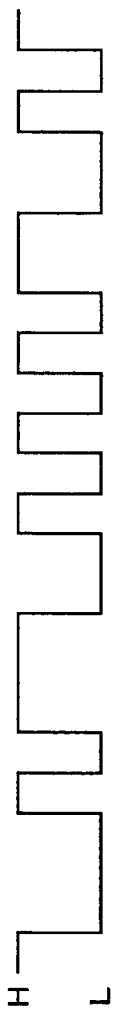
FIG. 3A (ATIP INFORMATION)
FIG. 3B (CHANNEL BIT PATTERN)
FIG. 3C (DBP)
FIG. 3D (CHANNEL BIT PATTERN)
FIG. 3E (DBP)

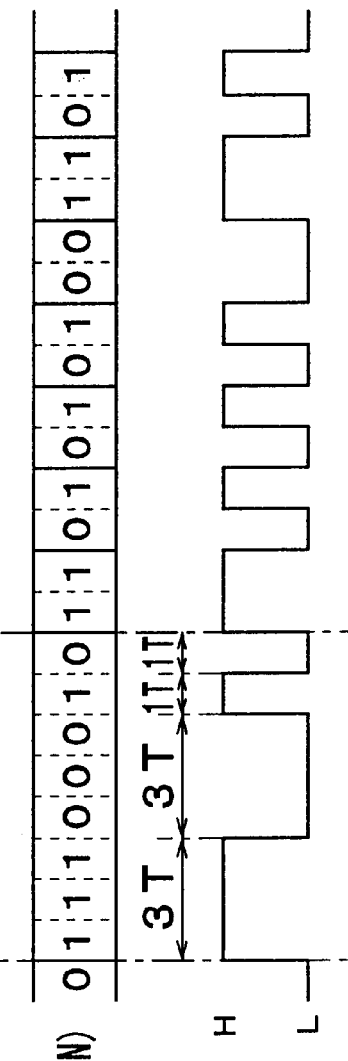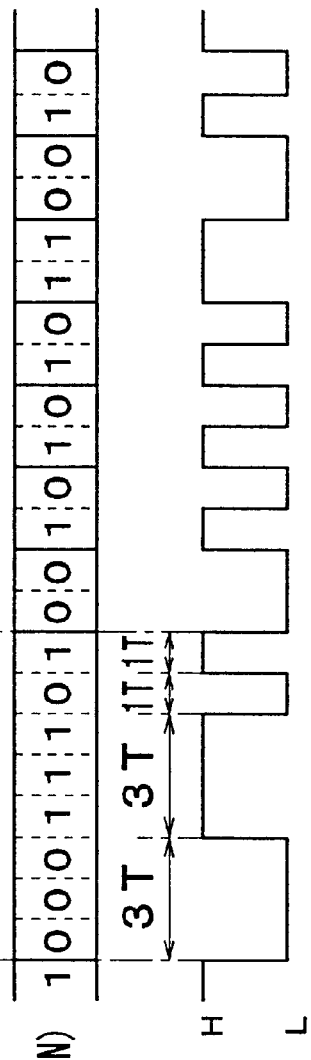
FIG. 5A (ATIP INFORMATION)
FIG. 5B (CHANNEL BIT PATTERN)
FIG. 5C (D$_{BP}$)
FIG. 5D (CHANNEL BIT PATTERN)
FIG. 5E (D$_{BP}$)

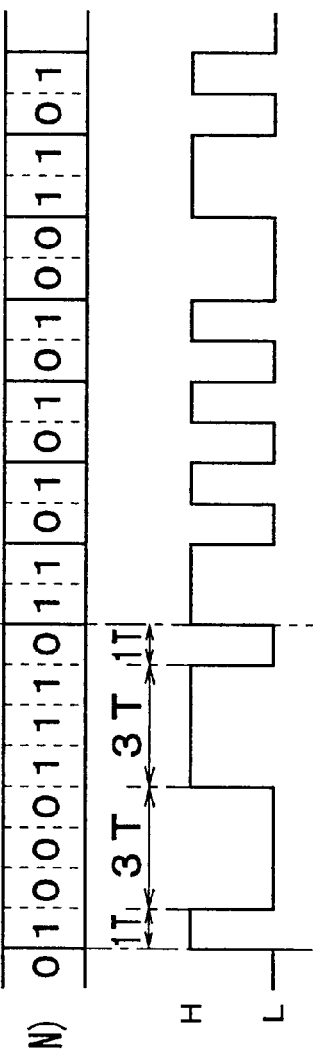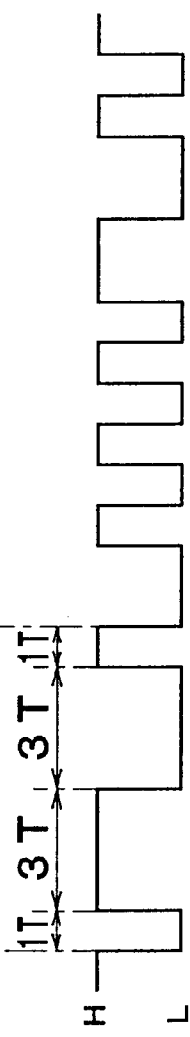
FIG. 6A (ATIP INFORMATION)
FIG. 6B (CHANNEL BIT PATTERN)
FIG. 6C (DBP)
FIG. 6D (CHANNEL BIT PATTERN)
FIG. 6E (DBP)

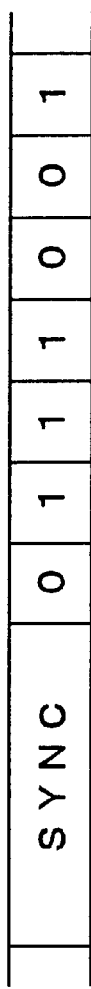
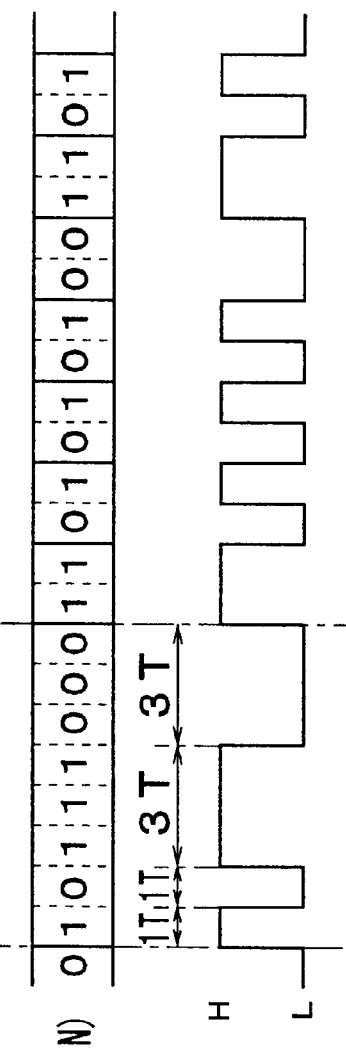
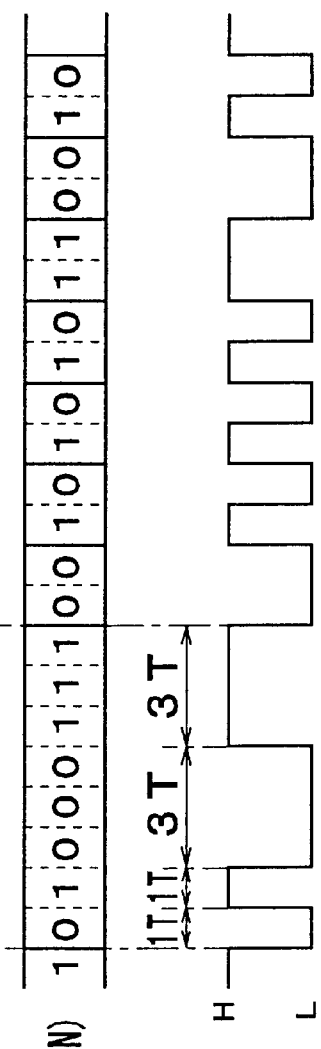
FIG. 7A (ATIP INFORMATION)
FIG. 7B (CHANNEL BIT PATTERN)
FIG. 7C (DBP)
FIG. 7D (CHANNEL BIT PATTERN)
FIG. 7E (DBP)

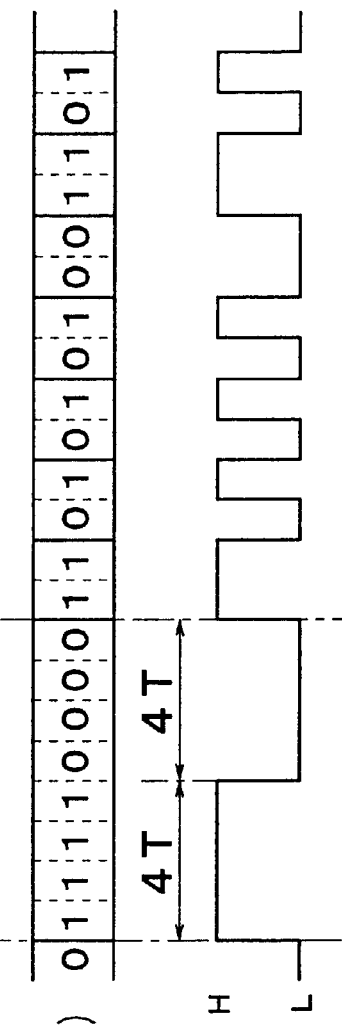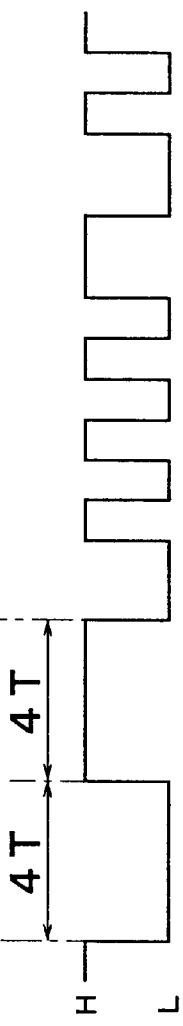
FIG. 8A (ATIP INFORMATION)
FIG. 8B (CHANNEL BIT PATTERN)
FIG. 8C (DBP)
FIG. 8D (CHANNEL BIT PATTERN)
FIG. 8E (DBP)

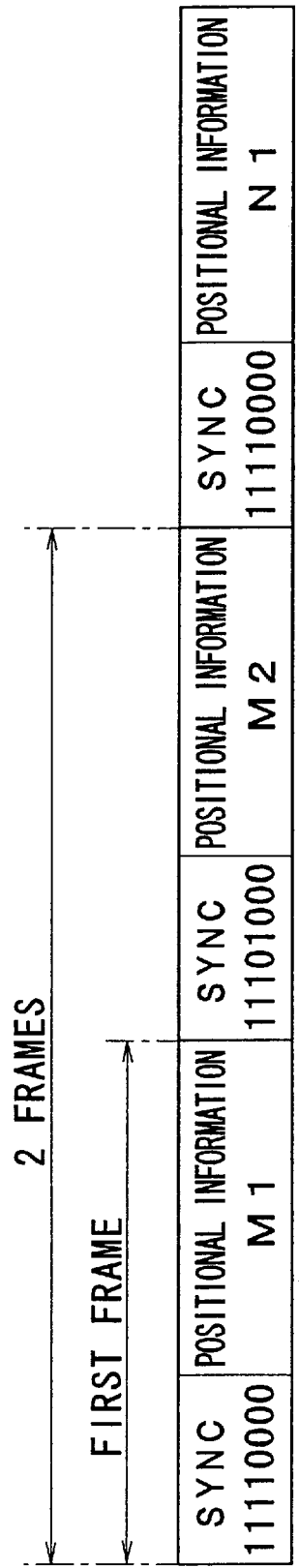
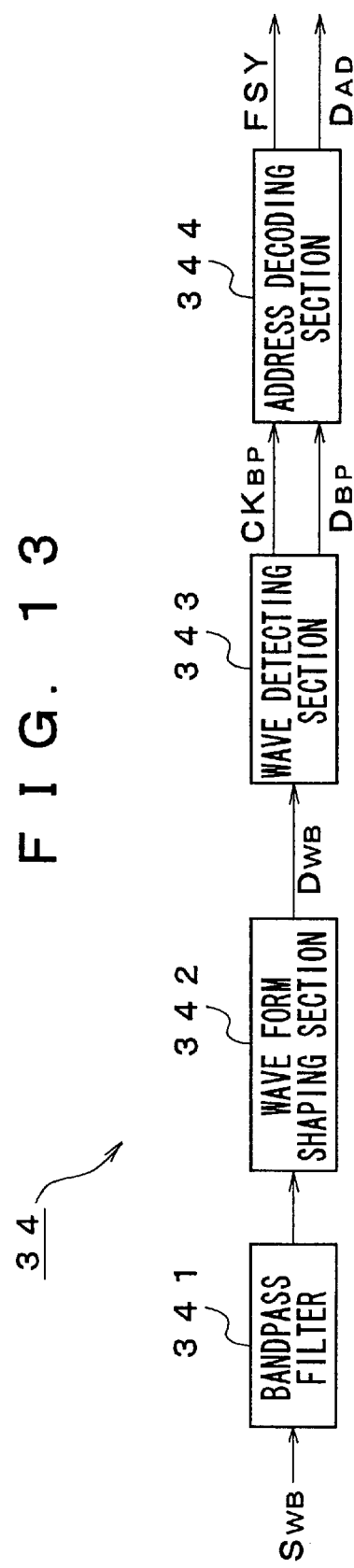

OPTICAL DISC AND OPTICAL DISC APPARATUS FOR IDENTIFYING SYNCHRONIZATION PATTERNS THEREOF

BACKGROUND OF THE INVENTION

1. Field of the Invention

The present invention relates to an optical disc and an optical disc apparatus. Specifically, in the present invention, optical discs in formats and/or recording modes different from each other are designed to have a different synchronization pattern of a signal obtained by reading positional information embedded in guide grooves irradiated with a light spot. In addition, in the present invention, an optical disc apparatus easily identifies whether the optical disc mounted thereto is an optical disc having a standard density or an optical disc having a high density by distinguishing their synchronization patterns from each other.

2. Description of the Related Art

In recent years, there is an increasing demand for a recording media having a larger capacity. As to an optical disc, in order to increase its recording density, methods such as narrowing its track pitches, shortening the minimum length of the recording bit have been suggested.

As to an optical disc satisfying the standard of a compact disc, for example, a write once optical disc (CD-R) and a rewritable optical disc (CD-RW) standardized in ISO/IEC13490-1, there is also a demand for increasing their recording capacity, in order that they can record larger amount of data.

When a write once optical disc or a rewritable optical disc provided with a large capacity is mounted to an optical disc apparatus for recording and reproducing a signal into or from the optical disc, the following operation is required for the optical disc apparatus. That is, the optical disc recording apparatus is required to quickly and easily identify whether the optical disc is an optical disc provided with a large recording capacity (hereinafter, referred to as a large density optical disc), or an optical disc having a standard recording capacity (hereinafter, referred to as a standard density optical disc) in formats and/or recording modes different from each other. If the apparatus cannot quickly and easily identify the optical disc, it cannot conduct a recording and reproducing operation suitable for each type of optical disc. For example, if the optical disc apparatus cannot identify whether or not the optical disc is a high density optical disc before demodulating data which has been recorded in an optical disc, the optical disc apparatus also cannot judge whether or not a processing designed specifically for a high density optical disc and a hardware exclusive to the high density optical disc are necessary. In this case, the optical disc apparatus requires a complicated processing for recognizing the type of the optical disc.

As to an optical disc into which no data is recorded (i.e. a blank disc), it is impossible to identify it by use of recorded data. Therefore, the blank disc is required to have information from which the blank disc can be identified beforehand.

SUMMARY OF THE INVENTION

In view of the aforementioned problems in the prior arts, the present invention has been conducted to provide an optical disc which can be easily identified whether or not it is an optical disc in a format and/or recording system different from the other optical disc, and an optical disc apparatus.

An optical disc of the present invention can conduct recording operation, and positional information is embedded in its guide grooves irradiated with a light spot. In the optical disc, a synchronization pattern of a signal obtained by reading the positional information is made to be different from a synchronization pattern of the other optical disc in a different format and/or recording mode.

Furthermore, an optical disc is capable of conducting recording operation and includes guide grooves for guiding a light spot in which positional information is embedded. The positional information is recorded by wobbling the guide grooves by a specified modulation mode, and the positional information has a specified synchronization signal including a synchronization pattern different from a synchronization pattern of a synchronization signal included in the positional information recorded in the other optical disc, having a recording density lower than a recording density of the optical disc, by the specified modulation mode.

An optical disc apparatus according to the present invention uses plural kinds of optical discs each of which can conduct recording operation, each of which includes positional information embedded in its guide grooves irradiated with a light spot, and each of which includes synchronization pattern that is obtained by reading the positional information and is made to be different from the synchronization pattern of the other optical discs in accordance with their format and/or recording modes, comprising: a positional information reading device for reading the positional information; and an identifying device for identifying the kind of the optical disc by recognizing a synchronization pattern of a signal obtained in the positional information reading device. In addition, the optical disc apparatus includes a position clarifying device for clarifying the position irradiated with a light spot from a signal obtained in the positional information reading device, and the position clarifying device clarifies the position irradiated with the light spot based on the result of the identification in the identifying device.

Furthermore, an optical disc apparatus scans first and second optical discs by a light spot to record and/or reproduce data in or from the first and second optical discs. The first and second optical discs are capable of conducting recording operation and formed with guide grooves for guiding the light spot in which positional information is embedded. The positional information is recorded into the optical discs by wobbling the guide grooves by a specified modulation mode. The positional information recorded in the first optical disc has a specified synchronization signal including a synchronization pattern different from a synchronization pattern of a synchronization signal included in the positional information recorded in the second optical disc having a recording density lower than a recording density of the first optical disc. The optical disc apparatus includes: a reproducing device for decoding the wobbled positional information; and an identifying device for identifying the first and second optical discs by recognizing the synchronization pattern included in the optical information read from the first and second optical discs.

In the present invention, for example, wobbles are formed as positional information in guide grooves irradiated with a light spot. A wobble component is extracted from each wobble to produce a synchronization pattern of a wobble signal. In this case, a high density optical disc and a standard density optical disc are manufactured in such a manner that their synchronization patterns of the wobble signal are different from each other. When, for example, a signal produced by reading a positional information from the optical disc is a bi-phase modulated signal, defining the minimum channel bit of the signal as "T", the synchronization pattern is set to have a pattern with "3T" or more, and also is set to have a DSV value of "0".

An optical disc apparatus to which the optical disc obtained in the above-described manner is mounted clarifies the synchronization pattern of the optical disc, and identify whether the optical disc is a high density optical disc or a standard density optical disc, based on the result of the clarification of the synchronization pattern. Based on the result of the identification of the optical disc, the signal is recorded or reproduced into or from the optical disc.

BRIEF DESCRIPTION OF THE DRAWINGS

FIG. 2 is a diagram showing a frame structure of ATIP information;

FIGS. 3A to 3E are diagram showing ATIP information and a bi-phase signal produced from an optical disc having a standard density;

FIGS. 4A to 4B are diagram showing a relationship between a bi-phase signal and a wobble signal;

FIGS. 5A to 5E are diagram showing ATIP information and bi-phase signal produced from an optical disc having high density;

FIGS. 6A to 6E are diagram showing ATIP information and another bi-phase signal produced from an optical disc having high density;

FIGS. 7A to 7E are diagram showing ATIP information and still another bi-phase signal produced from an optical disc having high density;

FIGS. 8A to 8E are diagram showing ATIP information and still another bi-phase signal produced from an optical disc having high density;

FIG. 11 is a diagram showing still another frame structure of ATIP information;

FIG. 13 is a diagram showing a structure of an ATIP decoder.

DESCRIPTION OF THE PREFERRED EMBODIMENT

Figure 1A:
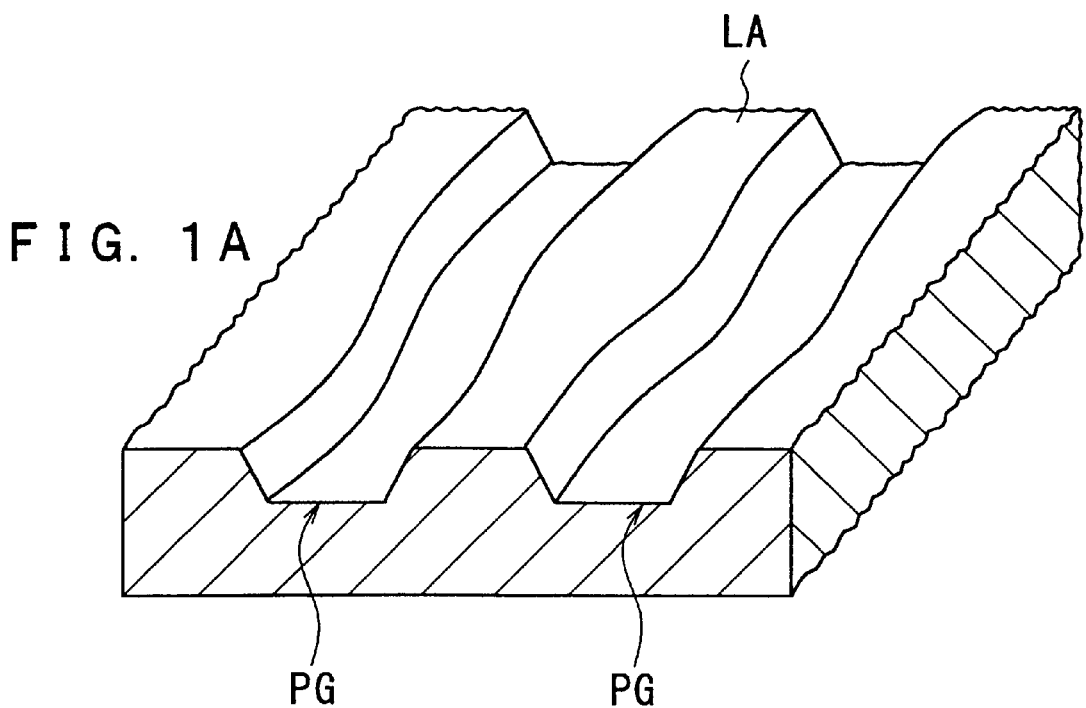
FIGS. 1A to 1B are diagram showing a structure of an optical disc.
Figure 1B:
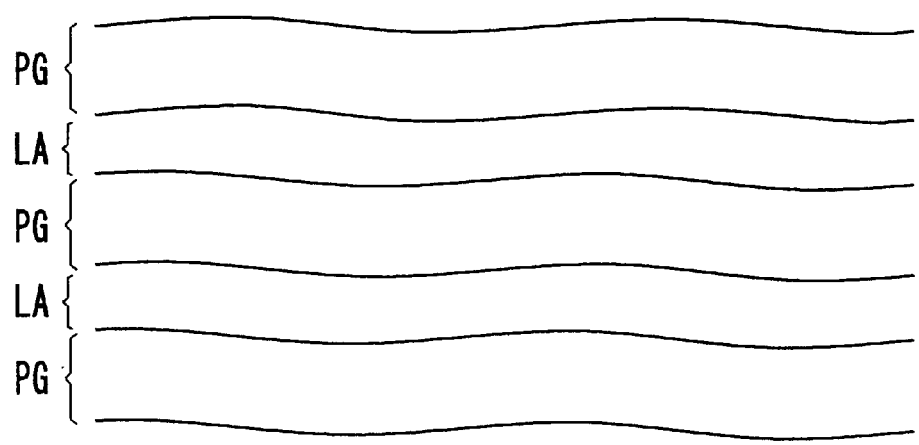

Next, the present invention will be described in detail with reference to the drawings. FIGS. 1A and 1B are diagrams each partially showing a structure of a write once or rewritable optical disc (CD-R or CD-RW) 10 satisfying the standard of a compact disc. As shown in FIG. 1A, the optical disc is formed with pregrooves PG on its surface to be irradiated with a laser beam. The pregrooves PG are guide grooves irradiated with a light spot of a laser beam. Each portion between adjacent two grooves is defined as a land LA. As shown in FIG. 1B, the side surfaces of each pregroove are slightly wobbled (i.e. serpentine) in the form of sine wave. From the wobbled side surfaces, a wobble component is extracted to produce a wobble signal SWB. The wobble signal is frequency modulated. In the wobble signal, time axis information indicating the positional information, i.e. an arbitrary position on the optical disc, and a recommended value of the power of the laser beam optimum for recording are encoded.

The wobble signal SWB is produced in such a manner that its center frequency becomes 22.05 kHz for example, when the optical disc 10 is rotated at a standard velocity (i.e. at a linear velocity of 1.2 m/s to 1.4 m/s). One sector of an absolute time in pregroove (ATIP) signal as time axis information is constituted in such a manner as to coincide to one data sector (with 2352 byte) after the signal is recorded. The data is written in the optical disc while the sector of the ATIP information is synchronized with the data sector.

FIG. 2 is a diagram showing a frame structure of the ATIP information. The first four bits constitute a synchronous signal SYNC. The "minutes", "seconds", and "frames", which indicate an absolute time on the optical disc together, are constituted by "2 digit BCD" (8 bits in total). A cyclic redundancy code (CRC) with 14 bits are further added. As a result, the ATIP information is constituted by 42 bits in one frame. The information as the recommended value of the power of the laser beam optimum for recording is recorded so as to be contained in the time axis information which is not commonly used.

FIGS. 3A to 3E are diagrams each showing a pattern of a synchronization signal SYNC of ATIP information (hereinafter, referred to as a synchronization pattern of ATIP information) produced by an optical disc of which recording capacity is not enlarged. The ATIP information shown in FIG. 3A is subjected to bi-phase marking modulation to have a channel bit pattern shown in FIG. 3B or 3D. Specifically, the ATIP synchronization signal SYNC is made to have a channel bit pattern of "1101000" as shown in FIG. 3B when the channel bit immediately preceding the ATIP synchronization information signal SYNC is "0". In this case, the bi-phase signal DBP having a waveform shown in FIG. 3C is, produced as a result of the bi-phase marking modulation. Contrary to this, the ATIP synchronization signal SYNC is made to have a channel bit pattern of "00010111" as shown in FIG. 3D when the channel bit immediately preceding the ATIP synchronization signal SYNC is "1". In this case, the bi-phase signal DBP having a waveform shown in FIG. 3E is produced.

After the bi-phase signal DBP is obtained as described above, the bi-phase signal DBP is frequency modulated as shown in FIGS. 4A and 4B to produce a wobble signal SWB. For example, when the bi-phase signal DBP shown in FIG. 4A is at high level "H", the bi-phase signal DBP is frequency modulated so as to have a frequency at 23.05 kHz as shown in FIG. 4B. When the bi-phase signal DBP shown in FIG. 4A is at low level "L", the bi-phase signal DBP is frequency modulated so as to have a frequency at 21.05 kHz. As a result, a wobble signal SWB having a center frequency at 22.05 kHz is produced.

In a high density optical disc of which recording capacity is enlarged as an optical disc in a format and/or recording mode different from that of a standard capacity optical disc, its synchronization pattern of the ATIP information is made to be different from those shown in FIGS. 3B and 3D. In this manner, even if the optical disc is a blank disc into which no data is written, it is possible to easily identify whether the optical disc is a standard density optical disc or a high density optical disc of which recording capacity is enlarged, by way of obtaining the wobble signal SWB to recognize the synchronization pattern of the ATIP information.

As the synchronization pattern of the ATIP information produced by the high density optical disc, a pattern hard to appear in a data series of "minutes", "seconds", "frames", and "CRC" is used. In this embodiment, the time axis information is subjected to bi-phase marking modulation, and defining the minimum interval between channel bits as "T", the signal after the bi-phase marking modulation is constituted by a pattern with "T" or "2T". Therefore, as the synchronization pattern of the ATIP information produced by the high density optical disc, a pattern with "3T" or more is used. In addition, the synchronization pattern preferably has a good DC balance. In this preferable synchronization pattern, defining the value of the bi-phase marking modulated signal at high level "H" as "1", and the waveform thereof at low level "L" as "−1", the waveform at high level "H"and the waveform at low level "L" of the bi-phase marking modulated signal are uniformly dispersed, and the digital sum value (DSV), i.e. the integrated value between the waveform at high level "H" of "1" and the waveform at low level "L" of "0" is close to "0".

The synchronization pattern of the ATIP information satisfying the above-described requirements, that is, having a good DC balance can be obtained in the following manner. A pattern to which a 3T waveform having a polarity reversed to the 3T waveform is provided at a top end, middle, or rear end portion of the ATIP synchronization signal.

FIGS. 5A to 5E are diagrams each showing a case where a pattern to which a 3T waveform having a polarity reversed to the 3T waveform is provided at a top end portion of the ATIP synchronization signal. As is the case shown in FIGS. 3A to 3E, when the ATIP information shown in FIG. 5A is subjected to bi-phase marking modulation, the ATIP information has a channel bit pattern shown in FIG. 5B. Based of the channel bit pattern, the bi-phase signal DBP having a waveform shown in FIG. 5C is produced. Defining the value of the bi-phase signal DBP at high level "H" as "1", and the value thereof at low level "L" as "−1", the waveform of the ATIP information is at high level "H" in the period of 4T, and at low level "L" in the period of 4T. As a result, the digital sum value "DSV" between the high level and low level becomes "0", thereby attaining a good DC balance. FIGS. 5B and 5C show the channel bit pattern and the bi-phase signal DBP in the case where the channel bit immediately preceding the ATIP synchronization signal SYNC is "0". When the channel bit immediately preceding the ATIP synchronization signal SYNC is "1", the channel bit pattern and the bi-phase signal DBP are as shown in FIGS. 5D and 5E.

Similarly, FIGS. 6A to 6E are diagrams each showing the case where a pattern to which a 3T waveform having a polarity reversed to the 3T waveform is provided at a middle portion of the ATIP synchronization signal. FIGS. 7A to 7E are diagrams each showing the case where a pattern to which a 3T waveform having a polarity reversed to the 3T waveform is provided at a rear end of the ATIP synchronization signal.

Alternatively, as shown in FIGS. 8A to 8E, it is also possible to use a pattern to which a 4T waveform having a polarity reversed to the 4T waveform as a synchronization pattern of the ATIP information. In this case as well, the digital sum value "DSV" between the high level and low level becomes "0", thereby attaining a good DC balance.

Figure 9:
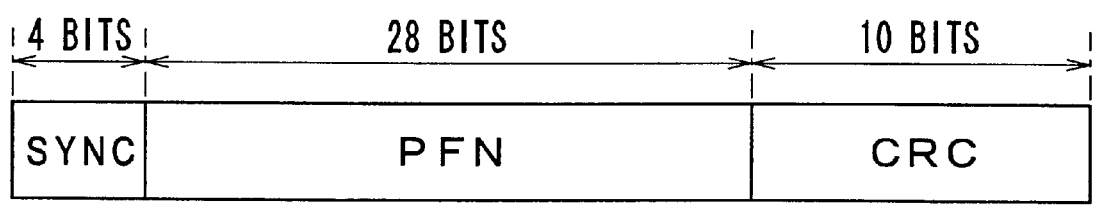
FIG. 9 is a diagram showing a frame structure of ATIP information.
Figure 10:
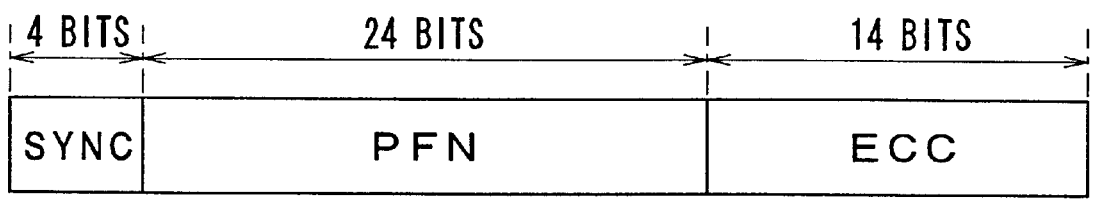
FIG. 10 is a diagram showing another frame structure of ATIP information.

In the method where each of "minutes", "seconds", and "frames" is indicated by "2 digit BCD", the indication is limited up to the position of "99 minutes and 59 seconds and 74 frames". There are some cases where information capable of indicating the position beyond "99 minutes and 59 seconds and 74 frames" is required for the high density optical disc having a large recording capacity. To satisfy such a requirement, as shown in FIG. 9 for example, 28 bits are allocated to a region of a physical frame number (PFN), and 10 bits are allocated to a region of CRC. In this manner, it becomes possible to show the absolute position on the optical disc by use of the wobbles formed therein even if it is a high density optical disc.

Furthermore, it is also possible, for example, to allocate 24 bits to a physical frame number region, and to allocate the remaining 14 bits to a region of an error correcting code (ECC). In this case, the high density optical disc is formed to have a specific synchronization pattern of the ATIP information different from the synchronization pattern of the ATIP information of a standard density optical disc when the error correcting code is used. In this manner, it becomes possible to identify whether the optical disc is a high density optical disc or a standard optical disc by recognizing the synchronization pattern of the ATIP information. At the same time, it is also possible to know which between CRC and ECC is recorded in the optical disc.

In the above-described case, one positional information is indicated by ATIP information in one frame. Alternatively, it is also possible to indicate one piece of positional information by ATIP information in a plurality of frames. FIG. 11 is a diagram showing the case where one piece of positional information is indicated by ATIP information in two frames. At least one of the synchronization pattern in either the first frame r the second frame is made to have a pattern different from the synchronization pattern of a standard density optical disc. At the same time, the first frame has a synchronization pattern different from the synchronization pattern of the second frame (except for the reversed polarity). As the synchronization pattern of the high density optical disc different from the synchronization pattern of a standard density optical disc, a pattern to which 3T waveform having a polarity reverse to a 3T waveform such as shown in FIGS. 5A to 5E to 7A to 7E, or a pattern to which 4T waveform having a polarity reverse to 4T waveform such as shown in FIGS. 8A to 8E is used.

In this case, as shown in FIG. 11, the synchronization pattern in the first frame is made to have a channel bit pattern of "11101000", and at the same time, the ATIP synchronization signal in the second frame is made to have a channel bit pattern of "11110000". The channel bit pattern of "11110000" is different from the channel bit pattern "11101000" or "00010111" of the ATIP information synchronization signal of the standard density optical disc. Therefore, the optical disc can be identified as a high density optical disc. In addition, since the first frame has a synchronization pattern different from that of the second frame, it can be recognized that one piece of positional information is indicated by information M1, M2 in two first and second frames respectively.

As described above, the high density optical disc is formed to have the synchronization pattern of the ATIP information different from that of the standard density optical disc. In this manner, it can be easily identified whether the optical disc is a high density optical disc or a standard density optical disc. In addition, the high density optical disc is formed to have a pattern different from that of the standard density optical disc, the position on the high density optical disc can be enlarged and indicated by the bits allocated to the ATIP synchronization signal and after in a method different from a method where an absolute time is indicated by "minutes", "seconds", and "frames" which are respectively indicated by "2 digit BCD", for example, in a method employing a 2-bit binary code.

Figure 12:
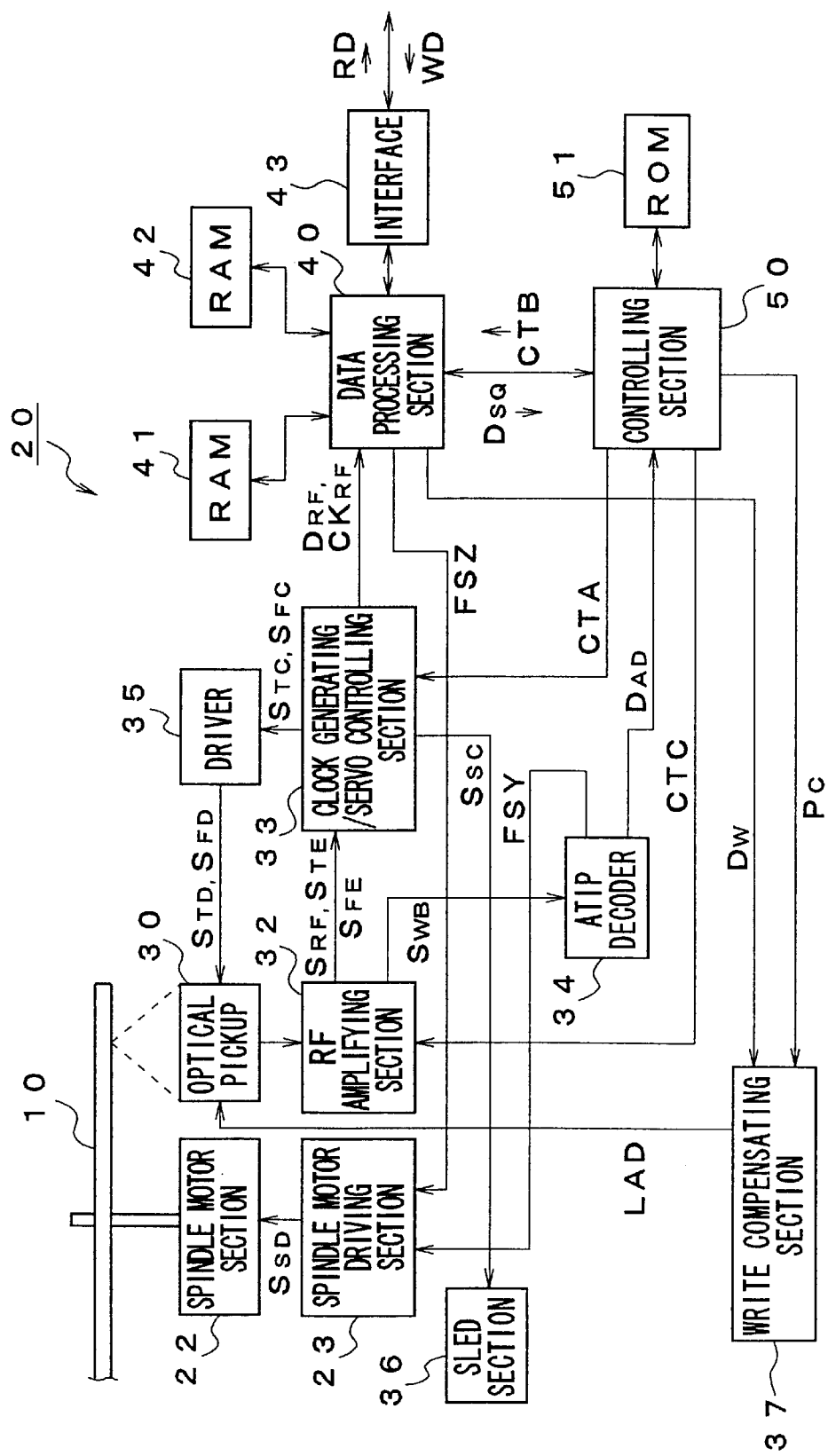
FIG. 12 is a diagram showing a structure of an optical disc apparatus.

Next, a structure of an optical disc apparatus to which an optical disc 10 is mounted will be described with reference to FIG. 12. The optical disc 10 is operated to rotate at a specified velocity by a spindle motor section 22. The spindle motor section 22 is driven to operate the optical disc 10 to rotate at a specified velocity by a spindle driving signal SSD provided from a spindle motor driving section 23 which will be described later.

The optical disc 10 is irradiated with a laser beam in a controlled light amount which is emitted from an optical pickup 30 in the optical disc apparatus 20. The laser beam is reflected by the optical disc 10, and is applied to a photodetecting section (not shown) in the optical pickup 30. The photodetecting section is constituted by a split light detector and the like, and produces a voltage signal in accordance with a reflected light through photoelectric conversion and current-voltage conversion, and then provides the resultant voltage signal to an RF amplifying section 32.

The RF amplifying section 32 produces a reading signal SRF, a focus error signal SFE, a tracking error signal STE, and a wobble signal SWB based on the voltage signal from the optical pickup 30. The reading signal SRF, the tracking error signal STE, and the focus error signal SFE produced in the RF amplifying section 32 are provided to a clock generating/servo controlling section 33. The wobble signal SWB is provided to an ATIP decoder 34.

The clock generating/servo controlling section 33 produces a focus controlling signal SFC for controlling an object lens (not shown) of the optical pickup 30 based on the supplied focus error signal SFE so that the laser beam is focused on a recording layer of the optical disc 10. Then, the resultant focus controlling signal SFC is supplied to the driver 35. At the same time, the clock generating/servo controlling section-33 produces a tracking controlling signal STC for controlling the object lens of the optical pickup 30 based on the supplied tracking error signal STE so that the laser beam is applied to a center position of a desired track.

The driver 35 produces a focus driving signal SFD based on the supplied focus controlling signal SFC. At the same time, the driver 35 produces a tracking driving signal STD based on the tracking controlling signal STC. The produced focus driving signal SFD and the tracking driving signal STD are supplied to the actuator (not shown) of the optical pickup 30. Based on the focus driving signal SFD and the tracking driving signal STD, the position of the objective lens is controlled to focus the laser beam to a center position of a desired track.

The clock generating/servo controlling section 33 conducts asymmetry compensation and binarization of the supplied reading signal SRF to convert it into a digital signal as a reading data signal DRF. The resultant reading data signal DRF is supplied to a data processing section 40. At the same time, the clock generating/servo controlling section 33 produces a clock signal CKRF synchronous with the digital signal obtained as a result of the conversion. The resultant clock signal CKRF is also supplied to the data processing section 40.

In addition, the clock generating/servo controlling section 33 also produces a sled controlling signal SSC for operating the optical pickup 30 to move in a radial direction of the optical disc 10 in the state of preventing the laser beam from being applied beyond the position defined as a result of tracking control. The sled section 36 drives a sled motor (not shown) based on the sled controlling signal SSC to operate the optical pickup 30 to move in a radial direction of the optical disc 10.

The ATIP decoder 34 to which the wobble signal SWB is supplied has a structure as shown in FIG. 13. The wobble signal SWB is supplied to the bandpass filter 341 in the ATIP decoder 34. The bandpass filter 341 limits the band of the wobble signal SWB in such a manner that the wobble component is taken out from the wobble signal SWB. The resultant wobble signal SWB is supplied to the waveform shaping section 342.

The waveform shaping section 342 binarizes the wobble signal SWB. The signal DWB, which is a binarized wobble signal, is supplied to the wave detecting section 343.

The wave detecting section 343 demodulates the signal DWB to produce a bi-phase signal DBP. At the same time, the wave detecting section 343 produces a clock signal CKBP synchronous with the bi-phase signal. The resultant bi-phase signal DBP and the clock signal CKBP are supplied to the address decoding section 344.

The address decoding section 344 demodulates the bi-phase signal DBP using the clock signal CKBP to produce an ATIP information signal DAD. In addition, the address decoding section 344 detects the pattern of the synchronization signal of the resultant ATIP information signal DAD to produce an ATIP synchronization detecting signal FSY. The ATIP information signal DAD is supplied to the controlling section 50. The ATIP synchronization detecting signal FSY, and the clock signal CKBP synchronous with the bi-phase signal DBP are supplied to the spindle motor driving section 23.

The data processing section 40 conducts EFM demodulation for the reading data signal DRF. At the same time, the data processing section 40 conducts error correction by employing a deinterleave processing, a cross interleave reed-solomon code (CIRC), and the like using a RAM 41 therein. The data processing section 40 also conducts an error correction by employing a descramble processing, an error correcting code, and the like. The data signal after the error correction is stored in a RAM 42 accommodated in the data processing section 40 as a buffer memory, and then, is supplied as a reproduction data signal RD to an external computer and the like through an interface 43.

The data processing section 40 takes out a subcode from the signal which has been subjected to the EFM demodulation to render the signal after taking out the subcode therefrom into a signal DSQ. The signal DSQ is supplied to the controlling section 50. At the same time, the data processing section 40 detects the frame synchronization signal FSZ of the signal after the EFM modulation, and supplies the detected frame synchronization signal FSZ to the spindle motor driving section 23.

The spindle motor driving section 23 uses the ATIP synchronization detecting signal FSY and the clock signal CKBP synchronous with the bi-phase signal DBP which are supplied from the ATIP decoder 34, when a signal is recorded in the optical disc 10. Contrary, the spindle motor driving section 23 uses the frame synchronization signal FSZ supplied from the data processing section 40 to produce the spindle driving signal SSDP for operating the optical disc 10 to rotate at a desired velocity, when the signal recorded on the optical disc 10 is reproduced. The spindle driving signal SSD produced in the spindle motor driving section 23 is supplied to the spindle motor section 22, thereby operating the optical disc 10 to rotate at a desired velocity.

Furthermore, when the recording data signal WD is supplied to the data processing section 40 from an external computer via the interface 43, the data processing section 40 temporality stores the recording data signal WD in the RAM 42 therein. In addition, the data processing section 40 reads the stored recording data signal WD and encodes it in a specified sector format, and add an error correcting code for error correction to the recording data signal WD. The data processing section 40 also conducts processings such as CIRC encoding and EFM modulation to produce a write signal DW, and supplies the write signal DW to the write compensating section 37.

The write compensating section 37 produces a laser driving signal LDA based on the supplied write signal DW, and supplies the laser driving signal LDA to the laser diode of the optical pickup 30. The write compensating section 37 corrects the signal level of the laser driving signal LDA based on the power compensating signal PC supplied from the controlling section 50 which will be described later. The correction of the signal level of the laser driving signal LDA is conducted in accordance with the characteristics of the recording layer of the optical disc 10, the spot shape of the laser beam, the linear velocity at which the recording is conducted, and the like. As a result, the power of the laser beam output from the laser diode of the optical pickup 31 is optimized, the signal is recorded in the optical disc.

A ROM 51 is connected to the controlling section 50. The controlling section 50 controls the operation of the optical disc apparatus 20 based on the program for operation control stored in the ROM 51. For example, the controlling section 50 identifies whether or not the optical disc mounted to the optical disc apparatus is a high density optical disc or a standard density optical disc from the synchronization pattern of the ATIP information signal DAD supplied from the ATIP decoder 34. In addition, the controlling section 50 supplies a control signal CTA to the clock generating/servo controlling section 33, and a control signal CTB to the data processing section 40, based on the result of identifying the kind of the disc, and the signal DSZ produced in the data processing section 40, or based on the result of clarifying the recording and reproducing position which is indicate by the ATIP information signal DAD supplied from the ATIP decoder 34. As a result, the data is recorded or reproduced in compliance with the standard density optical disc or the high density optical disc. In addition, the controlling section 50 produces a power compensation signal PC based on the information about the value at which the recording laser power indicated by the ATIP information signal DAD is set, and supplies the power compensation signal PC to the write compensating section 37. The controlling section 50 also supplies a control signal CTC to the RF amplifying section 32. Upon receiving the control signal CTC from the controlling section 50, the RF amplifying section 32 conducts an on-off control for the laser diode of the optical pickup 30, and, in order to lower the laser noise and the disturbance exerted to the reading signal, superimposes a high frequency on the laser beam.

When the signal is recorded in the optical disc 10 shown in FIG. 1 by use of the optical disc apparatus 20, the wobble is detected to recognize the synchronization pattern of the ATIP information by the ATIP decoder 34. From the synchronization pattern of the ATIP information, it is identified whether the optical disc is a high density optical disc or a standard density optical disc. Based on the result of this identification, the controlling section 50 clarifies the position on the optical disc from the ATIP information, thereby starting to write the signal from the desired position. Based on the result of the identification, the controlling section 50 supplies a controlling signal CTB to the data processing section 40. Upon receiving the controlling signal CTB, the data processing section 40 conducts encode processing, for example, error correction and encoding in compliance with the kind of the optical disc. Furthermore, the controlling section 50 supplies a controlling signals CTA and CTC to the clock generating/servo controlling section 33 and the RF amplifying section 32 respectively to give a servo gain and an RF amplifying gain in compliance with the kind of the optical disc.

When the signal recorded in the optical disc 10 is reproduced, the rotation of the optical disc 10 is controlled based on the reading signal SRF. In the controlling section 50, the position from which the signal is to be reproduced can be clarified based on the signal DSZ of the subcode produced based on the reading signal SRF. By use of the information as to the position from which the signal is to be reproduced, desired data can be read. Alternatively, in the controlling section 50, it is also possible to read a signal from a desired position by identifying the kind of the optical disc and clarifying the signal reading position based on the ATIP information, and by controlling each constituent element based on the result of identifying the kind of the optical disc and the result of clarifying the signal reading position, as is the above case where recording is conducted.

The frame structure of the ATIP information having the synchronization pattern and the ECC above has been described only for the purpose of exemplification, and does not limit the present invention thereto. In addition, in the above embodiment, it is identified whether or not the optical disc is a high density optical disc or a standard optical disc in formats and/or recording modes different from each other. It would be obvious that the identification of the optical disc is not limited as to its recording capacity.

What is claimed is:

1. An optical disc which can be utilized in a recording operation and in which positional information is embedded in its guide grooves irradiated with a light spot,
    wherein a synchronization pattern of a signal obtained by reading the positional information of the optical disc is different from a synchronization pattern of another optical disc in a different format and/or recording mode,
    wherein the optical disc has a recording density different than a recording density of the other optical disc, and wherein the synchronization pattern has a high value for a period of 3T or more immediately followed by a low value for a period of 3T or more representing one of a standard recording density and a high recording density in which T represents a signal bit.

2. An optical disc according to claim 1, wherein the synchronization pattern is set to have a DSV of "0".

3. An optical disc according to claim 2, wherein the said optical disc has a recording density higher than the recording density of the other optical disc, and wherein the synchronization pattern has either one of patterns of "3T+3T+1T+1T", "1T+3T+3T+1T", "1T+1T+3T+3T", and "4T+4T".

4. An optical disc according to claim 1, wherein the positional information is expressed in a form in compliance with the synchronization pattern.

5. An optical disc according to claim 1, wherein the optical disc has a recording density higher than the recording density of the other optical disc, and wherein the other optical disc has the positional information synchronized with a single frame based on the synchronization pattern, while the optical disc has the positional information synchronized with a plurality of frames based on the synchronization pattern.

6. An optical disc capable of being utilized in a recording operation and comprising guide grooves for guiding a light spot in which positional information is embedded, wherein the positional information is recorded by wobbling the guide grooves by a specified modulation mode, and the positional information has a specified synchronization signal including a synchronization pattern different from a synchronization pattern of another optical disc, wherein the optical disc has a recording density different than a recording density of the other optical disc, and wherein the synchronization pattern has a high value for a period of 3T or more immediately followed by a low value for a period of 3T or more representing one of a standard recording density and a high recording density in which T represents a signal bit.

7. An optical disc according to claim 6, wherein the other optical disc is formed based on a standard of a compact disc.

8. An optical disc according to claim 6, wherein the positional information is embedded in the guide grooves by a wobble signal obtained by further frequency modulating the positional information signal which is bi-phase modulated.

9. An optical disc according to claim 6, wherein the synchronization pattern has either one of patterns of "3T+3T+1T+1T", "1T+3T+3T+1T", "1T+1T+3T+3T", and "4T+4T".

10. An optical disc apparatus using plural kinds of optical discs each of which can be utilized in a recording operation, each of which includes positional information embedded in its guide grooves irradiated with a light spot, and each of which includes synchronization pattern that is obtained by reading the positional information and is made to be different from the synchronization pattern of the other optical discs in accordance with their format and/or recording modes, comprising:

a positional information reading device for reading the positional information; and an identifying device for identifying the kind of the optical disc by recognizing a synchronization pattern of a signal obtained in the positional information reading device, wherein a first optical disc has a recording density different than a recording density of a second optical disc, and wherein the synchronization pattern has a high value for a period of 3T or more immediately followed by a low value for a period of 3T or more representing one of a standard recording density and a high recording density in which T represents a signal bit.

11. An optical disc apparatus according to claim 10, wherein the identifying device identifies the optical disc as an optical disc having a recording density higher than a specified recording density when the synchronization pattern is "3T+3T+1T+1T", "1T+3T+3T+1T", "1T+1T+3T+3T", or "4T+4T".

12. An optical disc apparatus according to claim 10, comprising a position clarifying device for clarifying the position irradiated with a light spot from a signal obtained in the positional information reading device, wherein the position clarifying device clarifies the position irradiated with the light spot based on the result of the identification in the identifying device.

13. An optical disc apparatus according to claim 10, wherein a reproduced signal is processes based on the result of identifying the optical discs.

14. An optical disc apparatus for scanning first and second optical discs by a light spot to record and/or reproduce data in or from the first and second optical discs, the first and second optical discs capable of being utilized in a recording operation and formed with guide grooves for guiding the light spot in which positional information is embedded, the positional information being recorded into the optical discs by wobbling the guide grooves by a specified modulation mode, and the positional information recorded in the first optical disc having a synchronization signal including a synchronization pattern different from a synchronization pattern of a synchronization signal included in the positional information recorded in the second optical disc, comprising:

a reproducing device for decoding the wobbled positional information; and an identifying device for identifying the first and second optical discs by recognizing the synchronization pattern included in the optical information read from the first and second optical disc, wherein the first optical disc has a recording density different than a recording density of the second optical disc, and wherein the synchronization pattern has a high value for a period of 3T or more immediately followed by a low value for a period of 3T or more representing one of a standard recording density and a high recording density in which T represents a signal bit.

15. An optical disc apparatus according to claim 14, wherein the second optical disc is formed based on a standard of a compact disc.

16. An optical disc apparatus according to claim 14, wherein the positional information is embedded in the guide grooves by a wobble signal obtained by further frequency modulating the positional information signal which is biphase modulated.

17. An optical disc apparatus according to claim 14, wherein the synchronization pattern has either one of patterns of "3T+3T+1T+1T", "1T+3T+3T+1T", "1T+1T+3T+3T", and "4T+4T".

* * * * *